United States Patent [19]

Kato et al.

[11] Patent Number: 5,403,866

[45] Date of Patent: Apr. 4, 1995

[54] FOAMABLE RESIN COMPOSITION AND A THERMOPLASTIC FOAMABLE PATTERN AND METAL CASTING MANUFACTURING METHOD USING SAID COMPOSITION

[75] Inventors: Yoshiyuki Kato; Hideaki Shibata, both of Chiba, Japan; William Simmons, Birmingham; Nigel K. Graham, Staffordshire, both of England

[73] Assignees: Hitachi Chemical Co., Ltd., Tokyo, Japan; Foseco International Ltd., Birmingham, England

[21] Appl. No.: 108,173

[22] Filed: Aug. 18, 1993

Related U.S. Application Data

[63] Continuation of Ser. No. 854,918, Mar. 20, 1992, abandoned.

[30] Foreign Application Priority Data

| Mar. 20, 1991 | [JP] | Japan | 3-056412 |
| Aug. 26, 1991 | [JP] | Japan | 3-213580 |
| Jan. 29, 1992 | [JP] | Japan | 4-013512 |

[51] Int. Cl.⁶ .......................... C08J 9/14; B22C 7/02
[52] U.S. Cl. ........................ 521/98; 164/45; 164/47; 264/51; 264/109; 264/126; 428/304.4; 428/305.5; 521/134; 521/139; 521/142; 521/146; 525/902
[58] Field of Search .................. 521/98, 134, 139, 142, 521/146; 525/902; 428/304.4, 305.5; 164/45, 47; 264/109, 51, 126; 523/139, 141

[56] References Cited

U.S. PATENT DOCUMENTS

| 3,051,669 | 8/1962 | Emblem et al. | 523/139 |
| 3,943,089 | 3/1976 | Marpula et al. | 523/139 |
| 4,119,473 | 10/1978 | Lundgren et al. | 523/141 |
| 4,648,367 | 10/1987 | Ikeda et al. | 521/134 |
| 4,974,659 | 12/1990 | Shriver et al. | 523/139 |

FOREIGN PATENT DOCUMENTS

| 2289553 | 5/1986 | France. |
| 60-047037 | 3/1985 | Japan. |
| 60-184447 | 9/1985 | Japan. |
| 1-292040 | 11/1989 | Japan. |

OTHER PUBLICATIONS

World Patents Index Latest, Week 0290, Derwent Publications Ltd. London, GB; AN 90–011660; Nov. 1989.
World Patents Index Latest, Week 1785, Derwent Publications Ltd. London, GB; AN 85–102046; Mar. 1985.
Patent Abstracts of Japan; vol. 10, No. 25 Sep. 1985.
*World Patent Index, Week 1974, Derwent Publications, Ltd., London, GB; AN 74–35258V Dec. 1975.*
"Pyrolysis–GC and MS Applied to Study Oligomer Formation in the Degradation of Polystyrene an Styrene Copolymers" by Louise Dean, et al., published in Polymer Degradation and Stability; 25 (Jan. 1989) 143–160.

*Primary Examiner*—John Kight, III
*Assistant Examiner*—John M. Cooney, Jr.
*Attorney, Agent, or Firm*—Antonelli, Terry, Stout & Kraus

[57] ABSTRACT

Disclosed are a foamable resin composition which comprises a copolymer with a weight-average molecular weight of 150,000–350,000 produced by copolymerization of a monomer mixture of 55–85% by weight of styrene and 45–15% by weight of a methacrylic acid ester represented by general formula (I)

$$CH_2=C(CH_3)COOR \qquad (I)$$

(wherein R represents a $C_{1-4}$ alkyl group) and, having impregnated therein, 10% by weight or less of a foaming agent relative to said monomer mixture, a thermoplastic foamable pattern which is constituted by heating, foaming and molding of a foamable resin composition as claimed in claim 1, a metal casting manufacturing method which comprises a stage wherein a thermoplastic foamable pattern as claimed in claim 9 is especially surrounded by refractory material and a stage wherein molten metal is poured into said pattern in order to eliminate said pattern and, as the result of solidification of said metal, form a casting as a reproduction of said pattern, and a metal casting manufacturing method which comprises a stage wherein a thermoplas- (Abstract continued on next page.)

tic foamable pattern as claimed in claim 9 is especially surrounded by refractory material, a stage wherein said pattern is eliminated to form a space, a stage wherein molten metal is poured into said space and a stage wherein a casting is formed as a reproduction of said pattern by solidification of said metal.

2 Claims, 2 Drawing Sheets

FOAMABLE RESIN COMPOSITION AND A THERMOPLASTIC FOAMABLE PATTERN AND METAL CASTING MANUFACTURING METHOD USING SAID COMPOSITION

This application is a Continuation application of application Ser. No. 854,918, filed Mar. 20, 1992, now abandoned.

BACKGROUND OF THE INVENTION

The present invention relates to a foamable resin composition that is useful for manufacturing metal castings and to a thermoplastic foamable pattern and metal casting manufacturing method using this composition.

Patterns of foamed thermoplastic material such as foamed polystyrene are used in full mold processes or eliminated pattern processes (also called 'lost foam processes') in casting of molten metal (also called 'a melt'). One or more patterns or a mold runner system in correspondence to manufactured metal castings and a runner (sprue) are coated with refractory coating material (also called 'mold facing') and surrounded by sand in a flask defining a mold. When molten metal is poured into this mold, the patterns are decomposed and replaced by the metal and castings with the shapes of the patterns are produced through solidification.

Normally, a foamed polystyrene pattern used in this process is produced by introducing polystyrene beads that contain a readily volatizable foaming agent such as pentane and have been prefoamed by being heated and matured into a mold made of an ordinary metal such as aluminium and then heating the mold in order to cause the beads to fuse together and further causing the beads to foam so as to form the pattern. Generally, this secondary heating and foaming in the mold is effected by blowing steam into the prefoamed beads that have been packed in the mold.

It is well known that when a foamed polystyrene pattern is used in a full mold process or similar process, incomplete elimination or decomposition of the pattern can result in defects in the casting that is produced. Defects called 'carbon defects' are the most marked in iron casting, and there is occurrence of wrinkles, depression at the time of cooling, surface holes and inclusions which are thought to be due to the presence in the mold of tar-like products resulting from thermal degradation of the polystyrene. A number of proposals such as for the use of additives in patterns have been made with the object of mitigating the problem of carbon defects relating to foamed polystyrene patterns. Japanese Unexamined Patent Publication No. 24146/1965 discloses the use of ammonium perchlorate as an additive for a pattern, Japanese Unexamined Patent Publication No. 16925/1966 discloses the use of a depolymerization catalyst and UK Unexamined Patent Publication No. 2193666A discloses the use of an oxidizing agent such as iron oxide or manganese dioxide which oxidizes carbon to carbon dioxide and/or carbon monoxide.

However, these proposals have the drawback that making the molds is quite difficult and the effects in overcoming carbon defects are not proportionally great.

It has further been proposed to use polymers other than polystyrene for foamed plastic patterns. U.S. Pat. Nos. 4,790,367 and 4,983,640 disclose the use of patterns made of polyalkyl acrylates such as polymethyl methacrylate. However, when a polymethyl methacrylate polymer is used, it is not possible to effect through impregnation with a foaming agent and the expansion ratio of the foamed grains is low. There is also the drawback that the moldability is inferior and the mechanical strength and the quality of the surfaces of molded products are poor. During polymethyl methacrylate casting, a large amount of gas is frequently emitted and this causes blow-back (splashing) and results in the casting having a poor surface.

There have been attempts to make patterns out of a mixture of prefoamed polystyrene and prefoamed polymethyl methacrylate but a number of problems arise in the use of these products or similar patterns. These are that it is necessary to prefoam the two substances and in mixing them it is difficult to produce a uniform mixture. Since static electricity makes filling of a mold difficult and the optimum conditions of pressure and temperature for molding polystyrene differ from the optimum conditions of pressure and temperature for molding polymethyl methacrylate, it is difficult to find optimum conditions for the two and a compromise is necessary. The resulting pattern is weak, since its density is uneven, and what happens is that the polystyrene and polymethyl methacrylate beads only fuse with themselves and not with one another. In addition, the pattern has a poor surface.

Japanese Patent Publication No. 23458/1974 discloses a foamed pattern in which isobutyl methacrylate, which has good thermal decomposition characteristics, is made the main component and methyl methacrylate is used as a copolymerization component and also proposes a foamed pattern which has methyl methacrylate as the main component.

The abovenoted foamed patterns for which isobutyl methacrylate is used as the main component and methyl methacrylate is used as a copolymerization component have the drawback that their glass transition temperature is very much lower than that of polystyrene foamed bodies and if primary foaming and molding equipment that are used for polystyrene foamed bodies are employed there is considerable shrinkage of primary foamed grains and molded products. It is therefore necessary to use different molding units and to alter the molding conditions such as, e.g., the temperature and pressure, etc.

Because of this, a method of copolymerizing 80–95% by weight of methyl methacrylate and 20–5% by weight of styrene was proposed in the disclosure of Japanese Patent Publication No. 24307/1976 with the object of improving foaming characteristics. Also, a method of effecting copolymerization with addition of α-methylstyrene as a supplementary component at the time of methyl methacrylate polymerization was proposed in the disclosure of Japanese Patent Publication No. 40160/1975. Further, the use of a methyl methacrylate and α-methylstyrene copolymer foamed pattern is described in the disclosure of Japanese Patent Publication No. 184447/1985.

However, even with these foamed patterns for which methyl methacrylate is made the main component and styrene or α-methylstyrene is used as a copolymerization component, there is still the drawback of considerable shrinkage of primary foamed grains and of molded products and it is difficult to simultaneously achieve an increase in the primary expansion ratio and a reduction of shrinkage at the time of molding. Further, with patterns such as these there tends to be emission of an excessive amount of gas, so resulting in the production of castings with inferior surfaces.

SUMMARY OF THE INVENTION

The present invention is one which resolves these problems by the provision of a foamable resin composition with which polymerization from monomers can be effected easily and which has excellent foaming characteristics and molding characteristics, produces little soot during casting and makes it possible to produce castings with excellent surface states.

The invention relates to a foamable resin composition which comprises a copolymer with a weight-average molecular weight of 150,000–350,000 produced by copolymerization of a monomer mixture of 55–85% by weight of styrene and 45–15% by weight of a methacrylic acid ester represented by general formula (I)

$$CH_2=C(CH_3)COOR \qquad (I)$$

(where R represents a $C_{1-4}$ alkyl group), and, having impregnated therein, 10% by weight or less of a foaming agent relative to the above monomers.

The invention also relates to a thermoplastic foamable pattern which is produced by foaming the above foamable resin composition and heating and foaming it and molding it to a required shape.

A pattern such as this can be produced by prefoaming and maturing grains of the foamable resin composition, pouring the prefoamed grains into a mold with an internal shape matching the shape of a pattern unit the mold is full and then effecting further foaming and heating the mixture until the beads fuse together and form a pattern.

The invention further relates to a metal casting manufacturing method which comprises a stage in which a thermoplastic foamable pattern made of the abovenoted foamable resin composition is especially surrounded by refractory material and a stage in which molten metal is poured into the pattern in order to eliminate it and, as the result of solidification of the metal, form a casting as a reproduction of the pattern.

Preferably, the pattern is coated with refractory coating material (a facing agent).

DESCRIPTION OF PREFERRED EMBODIMENTS

Figure 1:
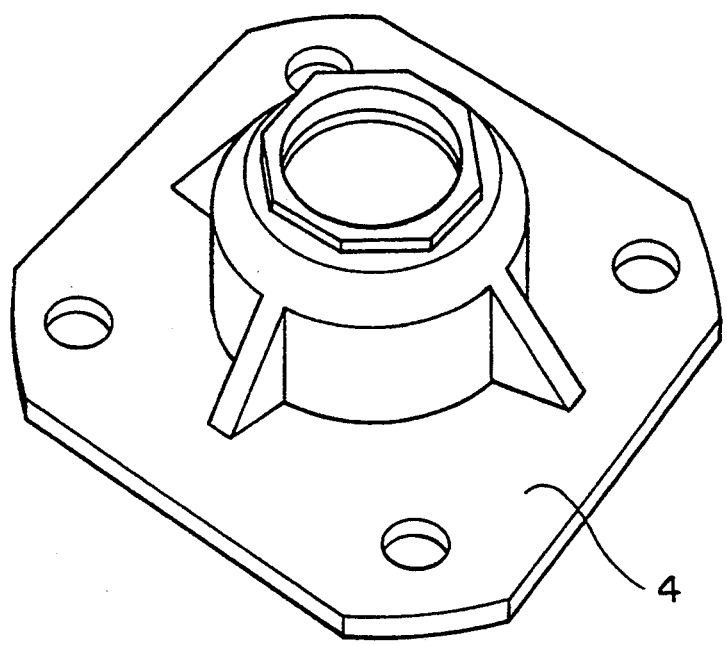
FIG. 1 is a perspective view showing the shape of valve bonnet foamed patterns and castings produced in examples of the invention.

First, a description relating to the foaming resin composition will be given.

R in the formula for the methacrylic acid ester of general formula (I) that is a copolymer component is a $C_{1-4}$ alkyl group, examples that may be cited including methyl, ethyl, n-propyl, isopropyl, n-butyl, sec-butyl, tert-butyl and isobutyl groups.

The copolymer constituting the main component in the foamable resin composition of the invention is a copolymer that is produced by copolymerizing 55–85% by weight, preferably 60–80% by weight, of styrene and 45–15% by weight, preferably 40–20% by weight, of a methacrylic acid ester represented by general formula (I). If there is more than 85% by weight of styrene and the material is made a foamed pattern, the degree of decomposition of the resin composition at the time of casting falls, there is production of soot (carbonaceous substances) and the casting skin is fouled. On the other hand, if the amount of the methacrylic acid ester exceeds 45% there is the drawback that the degree of primary foaming falls and there is a great degree of contraction at the time of molding.

The weight-average molecular weight (Mw) of the copolymer that is produced in the invention is controlled in the range 150,000–350,000. If the weight-average molecular weight exceeds 350,000, although there is an increase in strength as far as the matrix is concerned there is failure to achieve satisfactory foaming and molding fusion in the steam heating conditions of normal foaming and molding. A weight-average molecular weight of less than 150,000 can result in blocking at the time of foaming and surface skin dissolution (in a so-called keloidal form) in high temperature portions of the mold at the time of molding processing.

The abovenoted copolymer can be produced by any method such as solution polymerization, emulsification polymerization or suspension polymerization, etc.

An organic peroxide such as, e.g., lauroyl peroxide, benzoyl peroxide, t-butylperoxy(2-ethylhexanoate, t-butylperoxybenzoate, t-butylperoxypivalate or a similar mono-functional organic peroxide or 1,1-di-t-butyl-peroxy-3,3,5-trimethylcyclohexane, di-t-butylperoxyhexahydroterephthalate, di-t-butylperoxytrimethyladipate, di-t-butylperoxyisophthalate or a similar bifunctional organic peroxide or an azo compound such as azobisisobutyronitrile or azobisdimethylvaleronitrile, etc. can serve as a polymerization initiator that is used in polymerization of the copolymer.

It does not matter whether a polymerization initiator as noted above is added before the monomers are added to the polymerization vessel or is added after the monomers are added or is added together with the monomers. It is satisfactory if the polymerization initiator is so adjusted that the weight-average molecular weight of the copolymer produced is 150,000–350,000 and preferably an amount that is 0.1–2% by weight relative to the total amount of monomer is used.

It is also possible to use n-dodecylmercaptan, n-octylmercaptan, n-butylmercaptan or tert-butylmercaptan, etc. in order to adjust the molecular weight of the copolymer. The amount of such substances used is preferably $\leq 1$ mol % relative to the total amount of monomer.

The polymerization temperature can be suitably selected in the range 0°–200° C.

Preferably, a pentane which constitutes a readily-volatizable organic compound that is liquid at normal pressure and temperature and does not dissolve the abovenoted copolymer is used as a foaming agent for the foamable resin composition of the invention. The pentane used can be n-pentane, i-pentane, neopentane, or cyclopentane, etc. From the point of view of the maintenance characteristic of the foaming agent and the economics, impregnation with i-pentane is preferable. The amount of the foaming agent included is $\leq 10\%$ by weight and preferably 1–10% by weight relative to the copolymer. Outside this range it is not possible to produce a good foamed pattern.

In the invention, it is possible to make joint use of readily-volatizable organic compounds other than pentane that are liquids or gases at normal temperature and pressure and do not dissolve the copolymer. Examples of such substances that can be cited include aliphatic hydrocarbons such as propane, butane, hexane and petroleum ether, etc., cyclic hydrocarbons such as cyclohexane, etc. and aliphatic hydrocarbon halides such as methylene chloride, trichlorotrifuoroethane and dichlorodifluoroethane, etc. In the case of joint use of such foaming agents other than pentane too, the amount used is in a range that is ≦10% by weight relative to the total amount of copolymer.

If suspension polymerization is employed as the polymer manufacturing method, the polymer can be impregnated with the foaming agent by adding the foaming agent, preferably introducing it under pressure, in the latter half of polymerization. What is meant here by 'the latter half of polymerization' is the time when the polymerization conversion ratio is ≧50% by weight, preferably ≧70% by weight. By way of another procedure, there is a procedure in which grains of the copolymer in the shape of spheres or pellets are suspended in an aqueous medium and the foaming agent is added to this medium. Foaming agent impregnation in a suspension is preferably effected at 20°-130° C. By way of yet another procedure, one may melt and mix the copolymer and the foaming agent. Mostly, an extrusion machine is used in this case.

A plasticiser can be caused to be present at the time of impregnation of the copolymer with the foaming agent. An organic solvent that can dissolve the copolymer or cause it to swell can be used as a plasticiser. Material whose boiling point is about 10° C. or more lower than the softening point of the copolymer and is ≦150° C. is preferred. Plasticisers include aromatic hydrocarbons such as ethylbenzene, toluene, styrene and xylene, etc. and hydrocarbon halides such as 1,2-dichloropropane, trichloroethylene and perchloroethylne, etc. Preferably, 0-5% by weight of plasticiser relative to the copolymer is used.

Known additives such as antistatic agents, etc. may be included in the foamable resin composition of the invention.

Styrene resin foaming and molding methods that are widely employed industrially may be used without modification for foaming and molding of the foamable resin composition of the invention. Foaming can be effected by heating by steam or a gas at normal pressure or with application of pressure or under reduced pressure. For example, if the resin is in the form of grains, a foamed molded product can be obtained by prefoaming by steam followed by further steam foaming in a molding machine. alternatively, a foamed molded product can be obtained by using an extrusion and foaming machine.

Any ratio from a low ratio to a high ratio can be selected from the expansion ratio of the foamable resin composition according to the invention.

A foamed pattern can be produced from the foamable resin composition by methods such as described above. The foamed pattern produced is used in a metal casting manufacturing process which includes a stage of enclosure in refractory material such as sand, etc. and a stage in which molten metal is poured into the pattern in order to eliminate it and, as the result of solidification of the metal, form a casting as a reproduction of the pattern. As another metal casting manufacturing process, there is described the method which includes a stage wherein a thermoplastic foamable pattern is especially surrounded by refractory material, a stage wherein said pattern is eliminated to form a space, a stage wherein molten metal is poured into said space and a stage wherein a casting is formed as a reproduction of said pattern by solidification of said metal.

In this process, it is preferable that the foamed pattern be coated beforehand with refractory coating material by a procedure such as immersion, spraying or pour-in, etc.

Examples of this refractory coating material that can be cited include Styromol, Holcote (the above being tradenames and manufactured by the Foseco Company), Epico K-124, Epico K-125, Epico K-127 (the above being tradenames and manufactured by Kobe Rikagaku Kogyo KK), Oka Super 2500, Oka Super 2510, Oka Super 2700, Oka Super 2600, Oka Super 2600S, Oka Paint 310, Oka Paint 210, Oka Paint 101 (the above being tradenames and manufactured by Okazaki Kosanbutsu KK), Styrokote 270, Styrokote 380PM (the above being tradenames and manufactured by Cross KK) and Hard Mix VF20 (tradename, manufactured by Tsuchiyoshi KK), although there are no particular restrictions.

Nor are there any particular restrictions relating to the sand which surrounds the foamed pattern, and examples one may cite of this include quartz sand, chromite sand, zirconium sand and alumina sand.

Procedure that is normal procedure apart from the fact that the foamed pattern described above is used can be followed for the metal casting manufacturing method of the invention.

EXAMPLES

The invention will now be described in further detail by means of examples. 'Parts' and '%' below are on a weight basis.

Examples 1-7 and Comparative Examples 1-8

Lauroyl peroxide, benzoyl peroxide and t-butylperoxybenzoate and a molecular weight modifier constituted by n-octylmercaptan were dissolved in mixed solutions of monomers in the proportions noted in Table 1. Each solution was added, with stirring at 270 rpm, to an aqueous solution in which 5 g of tricalcium phosphate, 6 g of a 0.5% aqueous solution of sodium dodecylbenzenesulphonate and 0.5 g of sodium sulphate were dissolved in 1500 g of water in a 3 l autoclave and the atmosphere in the autoclave was replaced by nitrogen. Next, the temperature was raised to 80° C. and when the materials had been stirred for 10 hours at this temperature the amounts of pentane (with an n-pentane/i-pentane weight ratio of 8/2), toluene and butane noted in Table 1 were added. Next, the temperature was raised to 120° C. and the materials were stirred for 5 hours at this temperature. After this, the material was cooled and the foamable polymer grains were taken out, washed with hydrochloric acid, washed with water, dehydrated and dried.

The average grain diameters and the total amounts of volatile components in the foamable polymer grains produced were measured and are shown in Table 1. For the average grain diameter in the invention, grains produced by polymerization were screened to their respective grain diameters, curves plotting the cumulative weights against the grain diameters, taking the screened grains sequentially from the small-diameter grains on, were prepared and the average grain diameter was given as the grain diameter representing 50% of the cumulative weight. For the total amount of volatile matter, a 2 g sample was put into an aluminium dish and heated for 10 minutes at 180° C., the weights were determined and the amount is given as {(sample weight before beating)−(weight after heating)}/(sample weight)×100.

Prefoamed grains were produced by immersing these foamable polymer grains in 100° C. boiling water and heating for the times noted in Table 1. The specific volumes of the prefoamed grains were measured and the occurrence or otherwise of shrinkage was determined (visually) and are indicated in Table 1. For the specific volume, prefoamed grains were packed in a measuring cylinder with a capacity of 1000 ml, the weight was determined and the specific volume was given as volume/weight.

Shrinkage (y) was determined from $$y=[(a-b)/a]\times 100\ (\%)$$

(where a is the volume (ml) after recovery (after elapse of 24 hours after prefoaming and b is the volume (ml) immediately after prefoaming) and is indicated in Table 1.

The prefoamed grains were matured for 24 hours in air at 25° C. put into a metal mold for molding (molded boarded boards 190 mm lengthways×120 mm across×10 mm thick are produced) and heated for the times noted in Table 1 by 1.0 kg/cm².G(120° C.) steam in a table type autoclave to produce foamed moldings. After macroscopic assessment of the surface smoothness and of the occurrence or non-occurrence of shrinkage of the foamed moldings produced, the moldings were ignited and assessments of the production of black smoke and soot were made. The findings of these assessments are noted in Table 1.

Further, in order to determine the degree of shrinkage of the moldings, foamable polymer grains were separately foamed to a density of 0.020–0.021 g/cm³ in a normal-pressure steam batch type foaming unit. Using a reduced-pressure cooling type molding machine (Daiya VS-300 manufactured by Daisen Kogyo KK), these prefoamed grains were molded to a box-shaped moldings with a wall thickness of 50 mm and a size that was 552 mm lengthways×335 mm across×10 mm 150 mm high in the conditions VS heating: 3 seconds, heating 1:3 seconds, heating 2:7 seconds, water cooling: 10 seconds, free cooling: 300 seconds, steam pressure: 0.8 kgf/cm². The wall thickness of the moldings was measured immediately after molding, and relative to the forming mold dimension (50 mm) was within +2–0% (51–50 mm), and the moldings whose cooling conditions had not been excessive or insufficient were dried for 24 hours at 40° C.

The degree of shrinkage (y') of the moldings produced was determined from $$y'=[(a'-b')/a']\times 100\ (\%)$$

(here a' is the mold dimension (lengthways: 553 mm) and b' is the molding dimension (mm) after 24 hours), findings being noted in Table 1.

TABLE 1

|  | Example | | | | | | |
|---|---|---|---|---|---|---|---|
|  | 1 | 2 | 3 | 4 | 5 | 6 | 7 |
| Formulation (g) | | | | | | | |
| Styrene | 750 | 600 | 800 | 800 | 600 | 700 | 690 |
| Methyl methacrylate | 250 | 400 | | | 400 | 300 | 100 |
| Ethyl methacrylate | | | 200 | | | | 250 |
| Lauroyl peroxide | 2 | 2 | 2 | 2 | 5 | 2 | 3 |
| Benzoyl peroxide | 2 | 2 | 2.5 | 2.5 | 3 | 2 | 4 |
| t-butylperoxybenzoate | 1 | 1 | 1 | 1 | 2 | 1 | 1.5 |
| n-octylmercaptan | 1 | 1.5 | 0.5 | 0.5 | 3 | 0.5 | 2 |
| Pentane | 100 | 80 | 20 | 40 | 90 | 60 | 100 |
| Toluene | | | | | | 5 | |
| Butane | | | 80 | 60 | | 30 | |
| Characteristics | | | | | | | |
| Before foaming | | | | | | | |
| Molecular weight (*10⁴) | 29.6 | 26.5 | 34.1 | 32.6 | 17.2 | 25.4 | 20.7 |
| Average grain diameter (mm) | 0.61 | 0.54 | 0.47 | 0.65 | 0.44 | 0.41 | 0.62 |
| Volatile component content (%) | 8.1 | 6.7 | 6.2 | 6.9 | 6.5 | 6.2 | 7.1 |
| Pentane content (%) | 7.7 | 6.4 | 1.6 | 3.6 | 5.9 | 5.6 | 6.7 |
| Prefoaming | | | | | | | |
| Heating time (minutes) | 1 | 2 | 2 | 1 | 1 | 2 | 1 |
| Specific volume (ml/g) | 47 | 41 | 45 | 45 | 46 | 50 | 49 |
| Foamed grain shrinkage characteristic (macroscopic) | None | None | None | None | None | None | None |
| Foamed grain shrinkage degree (%) | 1.51 | 2.2 | 1.7 | 2.6 | 2.9 | 0.9 | 2.5 |
| Foamed moldings | | | | | | | |
| Heating time (minutes) | 1 | 2 | 2 | 2 | 1 | 2 | 1 |
| Specific volume (ml/g) | 61 | 54 | 58 | 58 | 60 | 64 | 62 |
| Shrinkage characteristic (macroscopic) | None | None | None | None | None | None | None |
| Molding shrinkage degree (%) | 0.3 | 0.3 | 0.4 | 0.4 | 0.3 | 0.3 | 0.4 |
| Surface smoothness | Good | Good | Good | Good | Good | Good | Good |
| Production of black smoke/soot | None | None | None | None | None | None | None |

|  | Comparative example | | | | | | | |
|---|---|---|---|---|---|---|---|---|
|  | 1 | 2 | 3 | 4 | 5 | 6 | 7 | 8 |
| Formulation (g) | | | | | | | | |
| Styrene | 1000 | 600 | 800 | 800 | 600 | 700 | 900 | 500 |
| Methyl methacrylate | | 400 | | | 400 | 300 | 100 | 500 |
| Ethyl methacrylate | | | 200 | | | | | |
| Butyl methacrylate | | | | 200 | | | | |
| Lauroyl peroxide | | 2 | 2 | 2 | 5 | 2 | 2 | 2 |
| Benzoyl peroxide | 2.5 | 2 | 2.5 | 2.5 | 3 | 2 | 2 | 2 |

TABLE 1-continued

| | | | | | | | | |
|---|---|---|---|---|---|---|---|---|
| t-butylperoxybenzoate | 1 | 1 | 1 | 1 | 2 | 1 | 1 | 1 |
| n-octylmereaptan | | 1.5 | 0.5 | 0.5 | 3 | 0.5 | 1 | 1 |
| Pentane | 80 | 80 | 20 | 40 | 90 | 60 | 100 | 100 |
| Toluene | | | | | | 5 | | |
| Butane | | | 80 | 60 | | 30 | | |
| Characteristics | | | | | | | | |
| Before foaming | | | | | | | | |
| Molecular weight (*$10^4$) | 24.2 | 16.2 | 36.7 | 14.1 | 28.2 | 28.5 | 27.4 | 26.2 |
| Average grain diameter (mm) | 0.51 | 0.57 | 0.62 | 0.52 | 0.49 | 0.53 | 0.57 | 0.55 |
| Volatile component content (%) | 6.9 | 7.6 | 8.2 | 7.2 | 11.4 | 7.4 | 7.9 | 8.0 |
| Pentane content (%) | 6.6 | 7.2 | 6.8 | 6.9 | 11.1 | 0.4 | 7.5 | 7.6 |
| Prefoaming | | | | | | | | |
| Heating time (minutes) | 1 | 1 | 3 | 0.5 | 0.5 | 3 | 1 | 1 |
| Specific volume (ml/g) | 52 | 47 | 36 | 51 | 47 | 46 | 50 | 44 |
| Foamed grain shrinkage characteristic (macroscopic) | None | Great | None | Great | Great | None | None | Exists (small) |
| Foamed grain shrinkage degree (%) | 1.2 | 11.7 | 1.5 | 6.2 | 5.7 | 1.4 | 1.1 | 4.1 |
| Foamed moldings | | | | | | | | |
| Heating time (minutes) | 1 | 1 | 3 | 1 | 1 | 3 | 1 | 1 |
| Specific volume (ml/g) | 68 | 57 | 58 | 66 | 59 | 55 | 64 | 57 |
| Shrinkage characteristic (macroscopic) | None | Great | None | Great | Great | None | None | Exists (small) |
| Molding shrinkage degree (%) | 0.6 | 1.9 | 0.3 | 1.8 | 1.6 | 0.3 | 0.3 | 0.5 |
| Surface smoothness | Good | Many Wrinkles | Large depressions | Many Wrinkles | Many Wrinkles | Large depressions | Good | Many Wrinkles |
| Production of black smoke/soot | Considerable | None | None | None | None | None | Considerable | Considerable |

*Molecular weight indicates the weight-average molecular weight (determined by gel permeation chromatography procedure, value converted to standard polystyrene).

Foamed Pattern Production, Metal Casting Manufacture and Evaluation

The results of tests in which the foamable resin grains of Examples 1-7 were used to make foamed patterns and metal castings were produced are noted below.

Foamable polystyrene (High Beads HFC-5000 manufactured by Hitachi Chemical Co., Ltd.) was used for comparison.

The foamable resin grains of Examples 1-7 were screened to give the range 26 mesh (0.60 mm) to 50 mesh (0.30 mm) and were prefoamed to 45 ml/g. After maturing for 24 hours at 20°-25° C., foamed patterns (168 mm × 168 mm, volume 520 cm³) for valve bonnets as shown in FIG. 1 (connection parts of service water piping) were molding. Then, these foamed patterns were used for casting iron and a comparison was made.

Casting was effected at 1450°-1470° C. using ductile cast iron (carbon 3.55, silicon 2.4, magnesium 0.04, manganese 0.2%). Casting evaluations were made three times each for Examples 1-7 and for the foamable polystyrene (HFC-5000).

The results were that in the case of the iron castings that were cast using foamable polystyrene (HFC-5000) for the foamed patterns, adhesion of carbon was found on the surfaces of all three of the castings and also carbon had penetrated into the interior of the iron. In contrast, with the iron castings that were cast using the foamable resin grains of Examples 1-7 for the foamed patterns, in all cases no adhesion of carbon was found on the surface of any of the three casting and there was no penetration of carbon into the interior of the iron. Further, a comparison of the surfaces of the castings produced showed that whereas the surfaces of the castings for which foamable polystyrene (HFC-5000) was used were very rough, the surfaces of the castings for which Examples 1-7 were used were smooth and free of bumps and depressions. It is possible that the roughness of the surfaces of the castings occurred because gas resulting from decomposition of the resin remained and consequently proper filling by the iron melt failed to be effected. It is possible that since the foamable resin grains of Examples 1-7 have a better thermal decomposition characteristic than the foamable polystyrene, they are more easily vaporized and consequently filling by the molten metal went forward easily simultaneously with occurrence of thermal decomposition of the resin and so no bumps or depressions were produced on the surfaces of the castings. Further, there was no phenomenon of the blow-back of molten metal due to gases of pyrolysis that is a characteristic when casting is effected using foamed patterns made of foamable polymethyl methacrylate.

EXAMPLE 8

A thermoplastic foamed pattern for a valve bonnet casting as shown in FIG. 1 with a weight of 3.7 kg, dimensions of 168×168×80 (mm) and an average thickness of 15 mm was molded to a density of 0.020-0.021 g/cm³ using foamed polystyrene (HFC-5000). A second pattern for the same casting was molded using a foamed copolymer produced from a monomer mixture containing 30% by weight of methyl methacrylate and 70% by weight of styrene.

The two patterns were fitted to a gate with a height of 15 mm and a cross-section of 8×40 (mm) by means of a special-purpose hot melt adhesive (CORFIX 600). These elements were mounted in turn to an end portion on the opposite side of a runner bar with dimensions of 140×40×40 (mm). The gate and runner bar were cut from a molded block with a density of 0.020 g/cm³ made from special-purpose polystyrene beads (BASF455, manufactured by the BASF Company).

This product was coated with special-purpose, water-based, moderately non-heat-insulating, gas permeable refractory material (Styromol 142.6) and dried at 45° C. A completely refractory fiber-based pouring gate and a 600 mm high down sprue were fitted to the center of the runner bar. Then, this completed product was placed in a flask and was surround by non-caking silica sand that was compacted by vibration. Molten ductile cast iron containing 3.74% of carbon, 0.01% of sulphur, 2.20% of silicon, 0.19% of manganese and 0.039% of magnesium was poured into the pouring gate at 1472° C. The resulting casting was cooled, removed from the sand, lightly shot-blasted and inspected for defects.

Figure 2A:
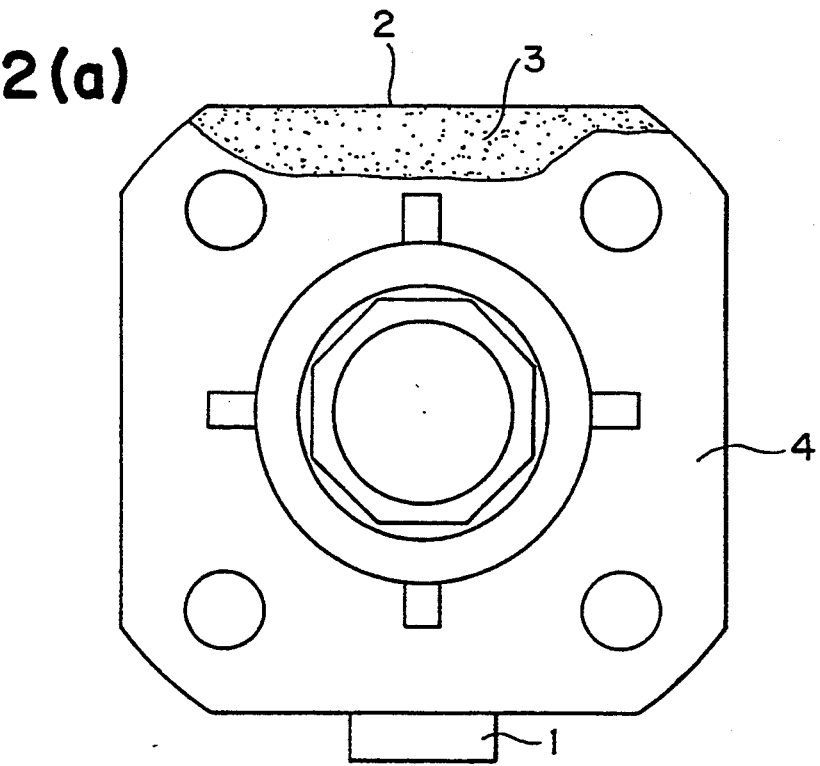
FIG. 2(a) is a front view of a casting produced in Example 8 of the invention and FIG. 2(b) is a rear view of the casting produced in Example 8.
Figure 2B:
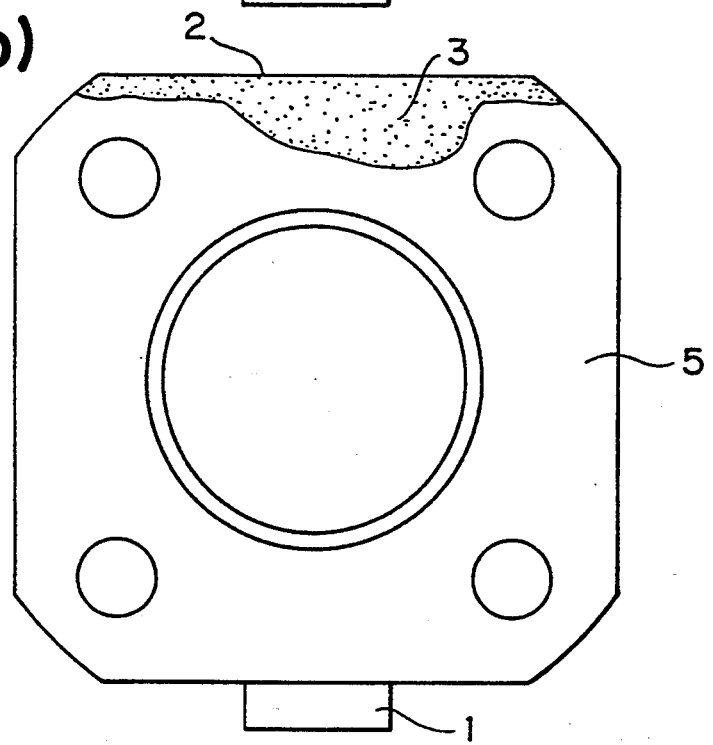

The findings will be described by means of FIG. 2 (*a*) which is a front view of the casting produced by the foamed polystyrene pattern and FIG. 2 (*b*) which is a rear view of this casting. In the figures, 1 is a gate located at the bottom of the casting, 2 indicates the top portion of the casting, 3 indicates the range of rough surface with defects, 4 indicates the front surface of the casting and 5 indicates the rear surface of the casting. The surface of the casting produced by the pattern made of a copolymer produced by polymerizing 30% by weight of methyl methacrylate and 70% by weight of styrene had no defects at all.

The above procedure was repeated and the same results were obtained.

Thanks to a metal casting manufacturing method using a thermoplastic foamable pattern made of the foamable resin composition of the invention, castings with a good surface condition and good dimensional precision can be produced without occurrence of defects such as carbon defects or melt folds, etc. at the time of casting.

We claim:

1. A metal casting manufacturing method which comprises a stage wherein a thermoplastic foamed pattern which is constituted by heating, foaming and molding of a foamable resin composition, is surrounded by refractory material and a stage wherein molten metal is poured into said pattern in order to eliminate said pattern and, as a result of solidification of said metal, form a casting as a reproduction of said pattern; said foamable resin composition comprising a copolymer with a weight-average molecular weight of 150,000–350,000 produced by copolymerization of a monomer mixture of 55–85% by weight of styrene and 45–15% by weight of a methacrylic acid ester represented by the general formula (I)

$$CH_2=C(CH_3)COOR \qquad (I)$$

wherein R represents a $C_{1-4}$ alkyl group and, having impregnated therein, 10% by weight or less of a foaming agent relative to said monomer mixture.

2. A metal casting manufacturing method which comprises a stage wherein a thermoplastic foamed pattern, which is constituted by heating, foaming and molding of a foamable resin composition, is surrounded by refractory material, a stage wherein said pattern is eliminated to form a space, a stage wherein molten metal is poured into said pattern and a stage wherein a casting is formed as a reproduction of said pattern by solidification of said metal; said foamable resin composition comprising a copolymer with a weight-average molecular weight of 150,000–350,000 produced by copolymerization of a monomer mixture of 55–85% by weight of styrene and 45–15% by weight of a methacrylic acid ester represented by the general formula (I)

$$CH_2=C(CH_3)COOR \qquad (I)$$

wherein R represents a $C_{1-4}$ alkyl group and, having impregnated therein, 10% by weight or less of a foaming agent relative to said monomer mixture.

* * * * *